US011941541B2

(12) United States Patent
Sathe et al.

(10) Patent No.: US 11,941,541 B2
(45) Date of Patent: Mar. 26, 2024

(54) AUTOMATED MACHINE LEARNING USING NEAREST NEIGHBOR RECOMMENDER SYSTEMS

(71) Applicant: International Business Machines Corporation, Armonk, NY (US)

(72) Inventors: Saket Sathe, Mohegan Lake, NY (US); Gregory Bramble, Larchmont, NY (US); Horst Cornelius Samulowitz, White Plains, NY (US); Charu C. Aggarwal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 16/988,809

(22) Filed: Aug. 10, 2020

(65) Prior Publication Data

US 2022/0044078 A1    Feb. 10, 2022

(51) Int. Cl.
*G06N 20/00*    (2019.01)
*G06F 17/16*    (2006.01)
(Continued)

(52) U.S. Cl.
CPC .............. *G06N 5/04* (2013.01); *G06F 17/16* (2013.01); *G06F 18/2113* (2023.01); *G06F 18/2193* (2023.01); *G06N 20/00* (2019.01)

(58) Field of Classification Search
CPC ....... G06N 5/04; G06F 17/16; G06F 18/2193; G06F 18/2113
See application file for complete search history.

(56) References Cited

U.S. PATENT DOCUMENTS 10,439,884 B1    10/2019  Forte et al.
10,565,528 B2 *   2/2020  Lokare .................... G06F 17/16
(Continued)

FOREIGN PATENT DOCUMENTS

EP    3779806 A1 *  8/2019

OTHER PUBLICATIONS

Wikipedia Weighted Arithmetic Mean, Retrieved en.wikipedia.org/wiki/Weighted_arthimetic_mean,14 pages, Archived Aug. 5, 2020. (Year: 2020).*

(Continued)

*Primary Examiner* — Scott T Baderman
*Assistant Examiner* — Barbara M Level
(74) *Attorney, Agent, or Firm* — Daniel J. Hakimi

(57) ABSTRACT

Methods, computer program products and/or systems are provided that perform the following operations: obtaining a performance matrix representing accuracies obtained by executing a plurality of pipelines on a plurality of training data sets, wherein a pipeline comprises a series of operations performed on a data set; selecting a defined number of top pipelines as potential pipelines for a testing data set based, at least in part, on a similarity between the testing data set and each of the plurality of training data sets represented in the performance matrix; storing results from executing each of the potential pipelines as a new data set; determining a pipeline accuracy for each of the potential pipelines when executed against the testing data set; and providing a recommended pipeline for use with the testing data set based, at least in part, on the pipeline accuracy for each potential pipeline.

20 Claims, 6 Drawing Sheets

(51) Int. Cl.
  *G06F 18/21* (2023.01)
  *G06F 18/2113* (2023.01)
  *G06N 5/04* (2023.01)

(56) References Cited

U.S. PATENT DOCUMENTS

| | | | | |
|---|---|---|---|---|
| 11,544,796 | B1* | 1/2023 | Mohamed | G06N 3/0985 |
| 2016/0232456 | A1 | 8/2016 | Jain et al. | |
| 2017/0161639 | A1* | 6/2017 | Zeng | G06F 16/9032 |
| 2017/0193392 | A1* | 7/2017 | Liu | G06N 20/00 |
| 2017/0330078 | A1* | 11/2017 | Koduru | G06N 5/01 |
| 2018/0137143 | A1 | 5/2018 | Brundage et al. | |
| 2018/0157971 | A1 | 6/2018 | Fusi | |
| 2019/0042956 | A1* | 2/2019 | Huang | G06N 7/08 |
| 2019/0339416 | A1* | 11/2019 | Elkabetz | G08G 5/025 |
| 2019/0377984 | A1* | 12/2019 | Ghanta | G06F 18/2155 |
| 2020/0274894 | A1* | 8/2020 | Argoeti | H04L 63/1433 |
| 2021/0097329 | A1* | 4/2021 | Jia | G06F 9/5027 |
| 2021/0097444 | A1* | 4/2021 | Bansal | G06N 3/08 |
| 2021/0174130 | A1* | 6/2021 | Austin | G06F 18/217 |
| 2021/0263828 | A1* | 8/2021 | Gross | G06N 20/00 |
| 2021/0326717 | A1* | 10/2021 | Mueller | G06N 20/00 |

OTHER PUBLICATIONS

Authors et. al.: Disclosed Anonymously, "Determining Validity of a Point of Interest Based on Existing Data", An IP.com Prior Art Database Technical Disclosure, IP.com No. IPCOM000252096D, IP.com Electronic Publication Date: Dec. 15, 2017, 33 pages.

Authors et. al.: Disclosed Anonymously, "Item Recommendations for Cache and Synchronization of Application Stores", An IP.com Prior Art Database Technical Disclosure, IP.com No. IPCOM000257131D, IP.com Electronic Publication Date: Jan. 15, 2019, 32 pages.

Authors et. al.: Disclosed Anonymously, "Ranking and Automatic Selection of Machine Learning Models", An IP.com Prior Art Database Technical Disclosure, IP.com No. IPCOM000252275D, IP.com Electronic Publication Date: Jan. 3, 2018, 34 pages.

Fusi et al., "Probabilistic Matrix Factorization for Automated Machine Learning", arXiv:1705.05355v2 [stat.ML] May 1, 2018, 14 pages.

Gijsbers, Pieter, "Automatic construction of machine learning pipelines", Technische Universiteit, Eindhoven University of Technology, Master Thesis, Oct. 2017, 65 pages.

Khiari et al., "MetaBags: Bagged Meta-Decision Trees for Regression", arXiv:1804.06207v1 [cs.LG] Apr. 17, 2018, 11 pages.

Roach, John, "Microsoft unveils AI capability that automates AI development", Sep. 24, 2018, 6 pages.

Sarwar et al., "Item-Based Collaborative Filtering Recommendation Algorithms", WWW10, May 1-5, 2001, Hong Kong, 11 pages, ACM 1-58113-348-0/01/0005.

Vanschoren, Joaquin, "Meta-Learning", Chapter 2, Automated Machine Learning, The Springer Series on Challenges in Machine Learning, © The Author(s) 2019, F. Hutter et al. (eds.), 27 pages, <https://doi.org/10.1007/978-3-030-05318-5_2>.

* cited by examiner

AUTOMATED MACHINE LEARNING USING NEAREST NEIGHBOR RECOMMENDER SYSTEMS

BACKGROUND

The present disclosure relates generally to the field of machine learning, and more particularly to providing pipeline recommendations using a nearest neighbor recommender.

In general, machine learning often involves several steps of preprocessing, culminating with a model building phase using the preprocessed data. These set of preprocessing operations plus model building together are often referred to as a pipeline (e.g., machine learning pipeline).

SUMMARY

According to an aspect of the present invention, there is a computer-implemented method, computer program product and/or system that performs the following operations (not necessarily in the following order): obtaining a performance matrix representing accuracies obtained by executing a plurality of machine-learning pipelines on a plurality of training data sets, wherein a machine-learning pipeline comprises a series of operations performed on a data set; computing a similarity between a testing data set and each of the plurality of training data sets represented in the performance matrix; selecting a defined number of columns of the performance matrix based on the similarity between the testing data set and each of the plurality of training data sets; selecting a defined number of top machine-learning pipelines as potential machine-learning pipelines for the testing data set based on the selected columns of the performance matrix; storing results from executing each of the potential machine-learning pipelines as a new data set; determining a pipeline accuracy for each of the potential machine-learning pipelines when executed against the testing data set; determining a recommended machine-learning pipeline for the testing data set based on the pipeline accuracy for each potential machine-learning pipeline; and providing the recommended machine-learning pipeline for use with the testing data set.

DETAILED DESCRIPTION

Figure 1:
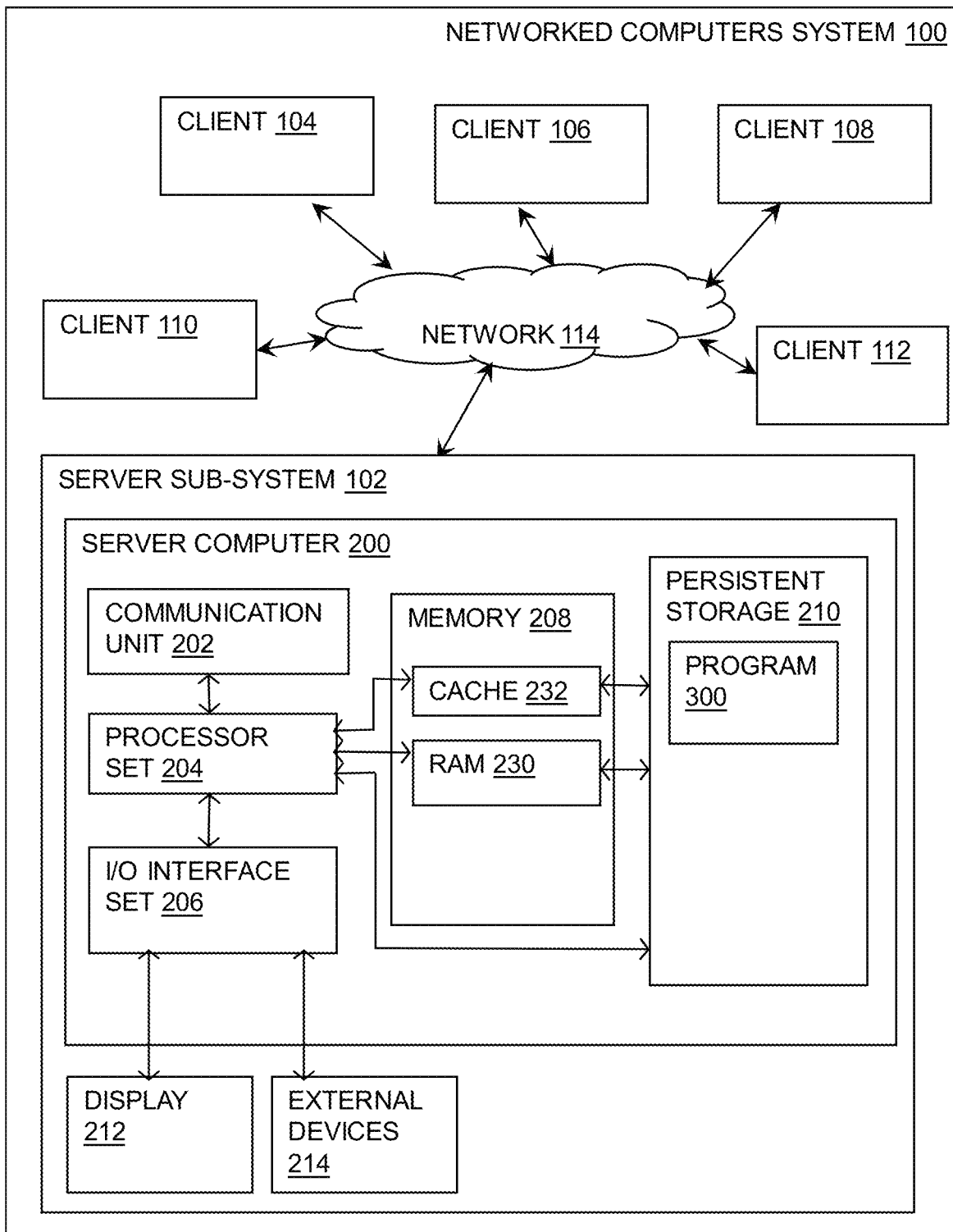
FIG. 1 is a block diagram view of a first embodiment of a system, according to the present disclosure.

According to aspects of the present disclosure, systems and methods can be provided to allow for machine learning pipeline recommendations through the use of nearest neighbor methods. In particular, systems and methods of the present disclosure can provide for recommendations of pipelines to be used on new data sets, and in some embodiments, such recommended pipelines can be obtained in a minimum number of pipeline executions. More particularly, embodiments of systems and methods of the present disclosure can provide for pipeline recommendations using K-nearest neighbor methods.

In general, machine learning often involves several steps of preprocessing, culminating with a model building phase using the preprocessed data. These sets of preprocessing operations plus model building together are often referred to as a pipeline (e.g., machine learning pipeline), and as used herein a "pipeline" can be a series of operations (e.g., data preprocessing, outlier detection, feature engineering, etc.) performed on a data set. Pipeline exploration is often time consuming due to the combinatorial nature of the problem. Pipeline recommendation, as provided by the systems and methods of the present disclosure, may recommend pipelines to be used in machine learning (e.g., in training machine-learned models, etc.) rather than try to construct an optimal pipeline for a data set. The systems and methods of the present disclosure can perform such pipeline recommendation based on constructing meta-models of the historical information on the performance of various pipelines on various data sets (e.g., training data sets, etc.).

According to aspects of the present disclosure, in some embodiments, the systems and methods disclosed herein can provide for K-nearest neighbor pipeline recommendation and may include an initialization process using an L1-norm of a training data set metafeature matrix with metafeatures of a new data set for which pipelines are to be recommended. Additionally, some embodiments may provide for pipeline recommendations using K-nearest neighbor along with Bayesian optimization.

This Detailed Description section provides the following sub-sections: The Hardware and Software Environment; Example Embodiment(s); and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of exemplary networked computers system 100, which may include: server sub-systems 102, 104, 106; client sub-systems 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that is used to create, manage and control certain software functions that will be discussed in detail, below, in the Example Embodiment sub-section of this Detailed Description section. As an example, a program 300 can comprise a machine learning pipeline recommendation system, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device(s) 208 and persistent storage device(s) 210 are computer-readable storage media. In general, memory device(s) 208 can include any suitable volatile or non-volatile computer-readable storage media. It is further noted that, now and/or in the near future: (i) external device set 214 may be able to supply, some or all, memory for sub-system 102; and/or (ii) devices external to sub-system 102 may be able to provide memory for sub-system 102.

Program 300 is stored in persistent storage device(s) 210 for access and/or execution by one or more of the respective computer processors in processor set 204, usually through one or more memories of memory device(s) 208. Persistent storage device(s) 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device(s) 210.

Program 300 may include both machine readable and performable instructions and/or substantive data (that is, the type of data stored in a database). For example, program 300 may include machine readable and performable instructions to provide for performance of method operations as further disclosed herein. In this particular embodiment, persistent storage device(s) 210 includes a magnetic hard disk drive. To name some possible variations, persistent storage device(s) 210 may include a solid-state hard drive, a semi-conductor storage device, read-only memory (ROM), erasable programmable read-only memory (EPROM), flash memory, or any other computer-readable storage media that is capable of storing program instructions or digital information.

The media used by persistent storage device(s) 210 may also be removable. For example, a removable hard drive may be used for persistent storage device(s) 210. Other examples include optical and magnetic disks, thumb drives, and smart cards that are inserted into a drive for transfer onto another computer-readable storage medium that is also part of persistent storage device(s) 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device device(s) 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

EXAMPLE EMBODIMENT(S)

Figure 2:
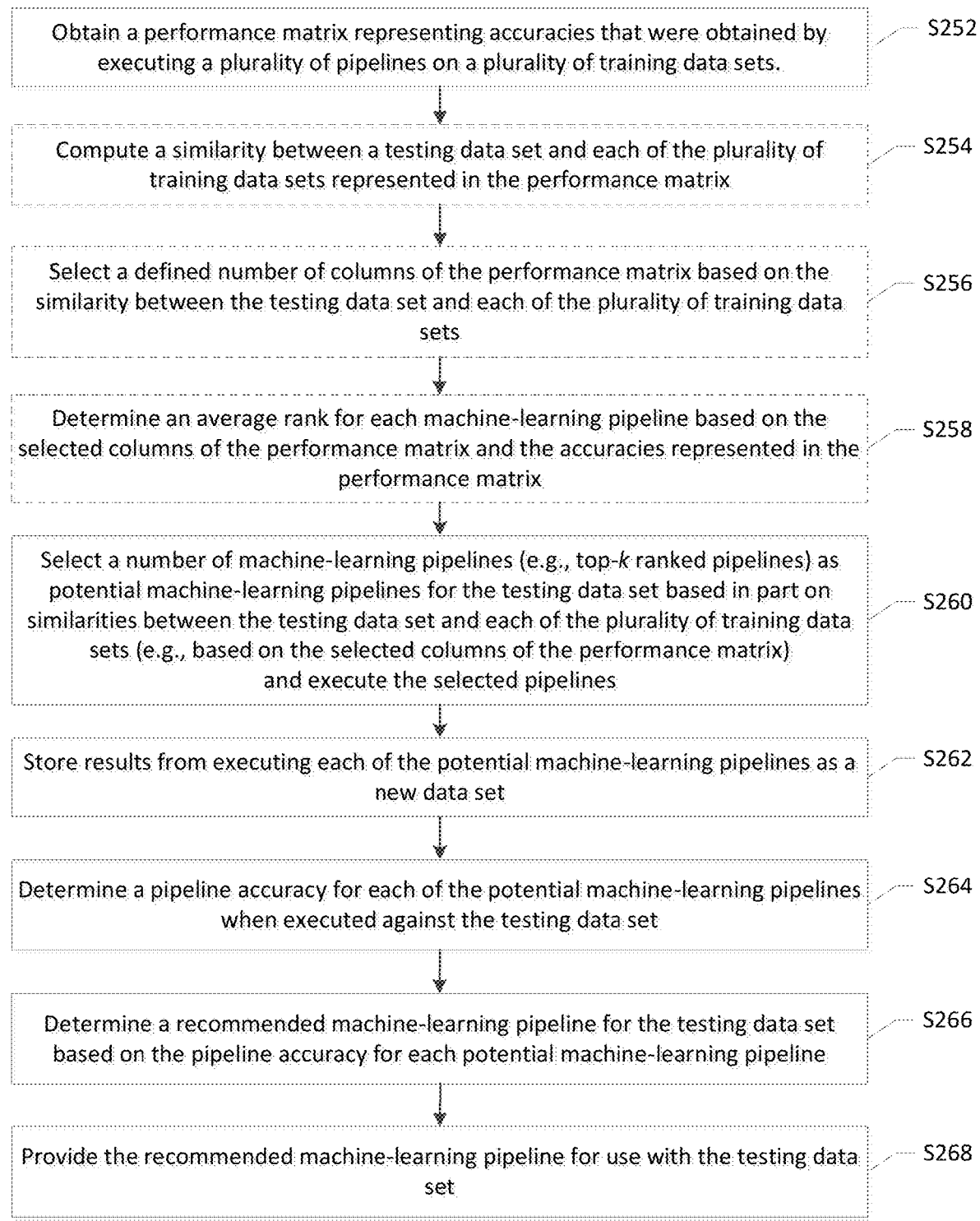
FIG. 2 is a flowchart showing a first embodiment method performed, at least in part, by the first embodiment system.
Figure 3:
FIG. 3 is a flowchart showing an embodiment of an initialization method performed, at least in part, by the first embodiment system.

FIG. 2 shows flowchart 250 depicting a computer-implemented method according to aspects of the present invention. FIG. 3 shows flowchart 350 depicting a computer-implemented method, provided in some embodiments, for initialization prior to the operations of flowchart 250 of FIG. 2, according to aspects of the present invention. With regard to FIG. 2 and FIG. 3, one or more flowchart blocks may be identified with dashed lines and represent optional steps that may additionally be included, but which are not necessarily required, in the depicted embodiments.

As illustrated in FIG. 2, in some embodiments, operations for pipeline recommendation begin at operation S252, where a computing system (e.g., server computer 200 of FIG. 1 or the like) obtains a performance matrix representing accuracies that were obtained by executing a plurality of pipelines (e.g., machine learning pipelines, etc.) on a plurality of training data sets. As described herein, a pipeline (e.g., machine learning pipeline, etc.) is a series of operations, for example, data preprocessing, outlier detection, feature engineering, and/or the like, that can be performed on given data set(s). The performance matrix is representative of historical information associated with the performance of various pipelines on various data sets. The performance can be measured using any one of a plurality of performance measures, such as for instance, area under receiver operating characteristic curve (AUC ROC), accuracy, F1-score, area under precision-recall curve, mean squared error, and/or the like. Each (i, j) entry in the performance matrix represents an accuracy obtained by executing a pipeline i and a training data set j.

Figure 4A:
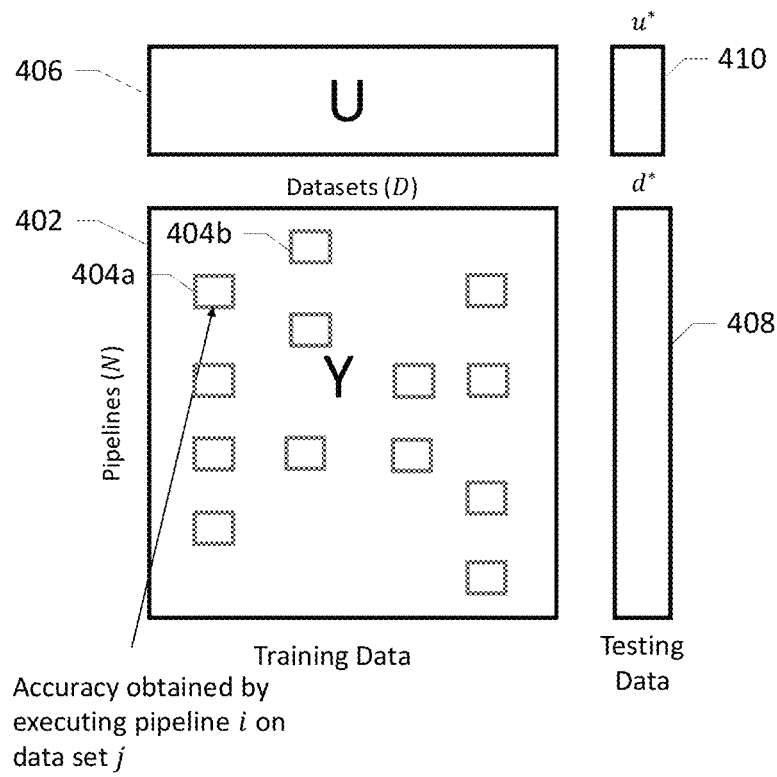
FIGS. 4A-4D illustrate block diagrams of example data sets and matrices used in pipeline recommendation, according to the present disclosure.

In an example, as illustrated in FIG. 4A, in some embodiments, the performance matrix may include a sparse performance matrix Y 402 that represents data associated with a plurality of training datasets (D) and a plurality of pipelines (N). The sparse performance matrix Y 402 includes accuracy entry (e.g., $y_{ij}$) 404a, accuracy entry 404b, etc. obtained by executing a pipeline (e.g., pipeline i) of the plurality of pipelines (N) on a data set (e.g., data set j) of the plurality of datasets (D). Each (i, j) entry in the performance matrix (e.g., sparse performance matrix Y 402) represents an accuracy obtained by executing a pipeline i and a training data set j. Further, FIG. 4A illustrates testing data d* 408 representative of a new data set for which pipeline(s) are to be recommended, a data set metafeatures matrix U 406 where each column $u_j$ contains metafeatures associated with data set $d_j$, and metafeatures u* 410 associated with the testing data d* 408. The metafeatures will be discussed further herein with regard to the operations of FIG. 3.

Processing proceeds to operation S254, where the computing system (e.g., server computer 200 of FIG. 1 or the like) can compute a similarity between a testing data set (e.g., a new data set for which pipeline(s) are to be recommended) and each of the plurality of training data sets represented in the performance matrix. For example, a similarity measure, such as cosine similarity, Pearson Coefficient, adjusted cosine similarity, mean-centered cosine similarity, and/or the like can be used to compute the similarity between the testing data set and a training data set. Only entries that are present in both the testing data set (d*) and a training data set ($d_j$) are used for the similarity computation between the data sets.

Figure 4B:
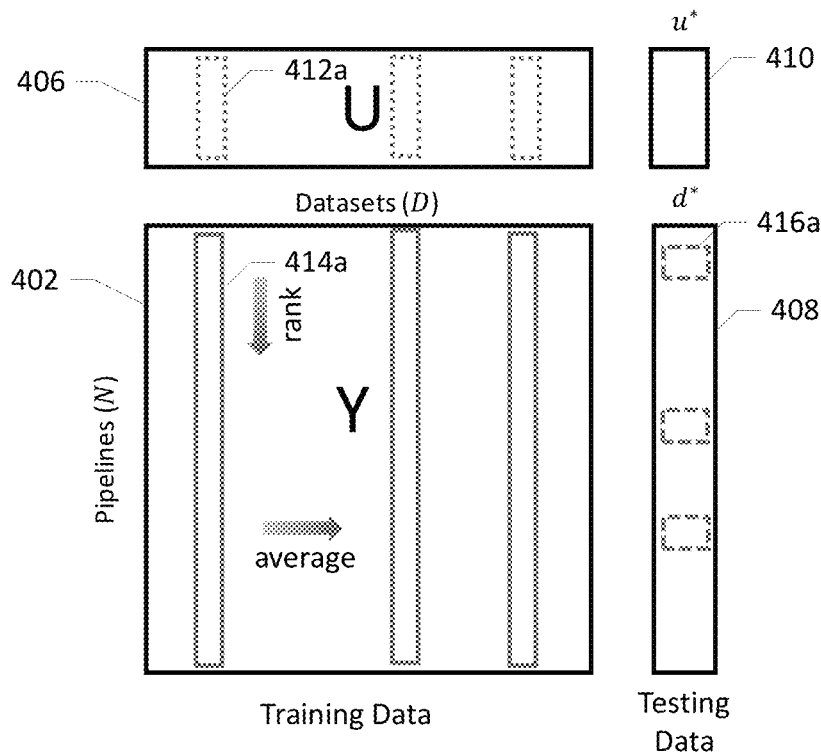
Figure 4C:
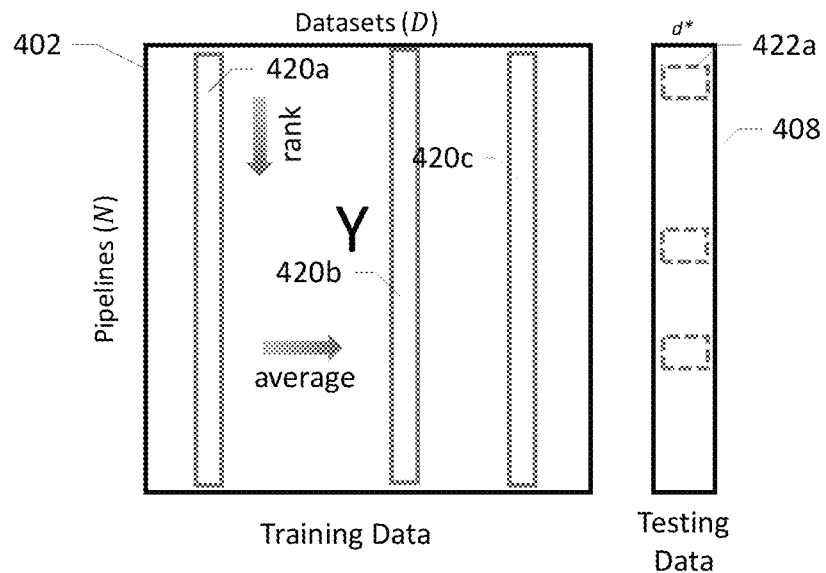

Processing proceeds to operation S256, where the computing system (e.g., server computer 200 of FIG. 1 or the like) can select a defined number of columns of the performance matrix (e.g., training data sets) based on the similarity between the testing data set and each of the plurality of training data sets. For example, in some embodiments, the top-k most similar columns (e.g., data sets) in the performance matrix to the testing data set (d*) may be selected. In an example, as illustrated in FIG. 4C, in some embodiments, one or more columns, such as column 420a, column 420b, column 420c, etc., of the performance matrix 402 may be selected based on the similarity of the training data set ($d_j$) represented by each column and the testing data set (d*).

Processing optionally proceeds to operation S258, where the computing system (e.g., server computer 200 of FIG. 1 or the like) can determine an average rank for each machine-learning pipeline based on the selected columns of the performance matrix and the accuracies represented in the performance matrix. For example, in some embodiments, each selected column of the performance matrix (e.g., representing a training data set $d_j$) can be converted to a rank whereby each of the pipelines is ranked based on the accuracy (e.g., included in the performance matrix). As an example, the best ranked pipeline in the column can be ranked 1 and the least accurate pipeline can be ranked n. After ranking the pipelines in each column of the performance matrix, an average rank per pipeline can be computed. The average rank can then be used to select a number of top ranked pipelines at operation S260, in some embodiments.

Alternatively, in some embodiments, the computing system (e.g., server computer 200 of FIG. 1 or the like) can apply Bayesian optimization and determine a similarity-weighted mean and variance of pipeline accuracy for each machine-learning pipeline. An expected, improvement criteria can be determined based in part on the mean and variance and the expected improvement criteria can be used to select the next number of pipelines (next-k pipelines) to execute at operation S260.

For example, in some embodiments, the mean of the pipeline accuracies can be predicted as $$y_{i*} = \frac{\sum_{j \in top-k\ similar\ data\ sets} (s_j * y_{ij})}{\sum_{j \in top-k\ similar\ data\ sets} (|s_j|)}$$

and the variance can be predicted as $$\sigma_{i*}^2 = \frac{\sum_{j \in top-k\ similar\ data\ sets} s_j(y_{i*} - y_{ij})^2}{\sum_{j \in top-k\ similar\ data\ sets} (|s_j|)}.$$

The expected improvement (EI) criteria can then be determined by $$\gamma_{i*} = \frac{y_{i*} - y_{best} - \xi}{\sigma_{i*}}$$

and $EI_{i*} = \sigma_i$, $[\gamma_i \Phi(\gamma_{i*}) + \mathcal{N}(\gamma_i, |0,1)]$, where $\Phi(\bullet)$ is a Gaussian Cumulative Distribution Function, $\mathcal{N}(\bullet|0,1)$ is a Gaussian Probability Density Function with zero mean and 1 variance, and $\xi$ is a free parameter to encourage exploration (e.g., usually very small values, such as 0.01). A pipeline i can then be executed with $argmax_i\ EI_{i*}$.

Figure 4D:
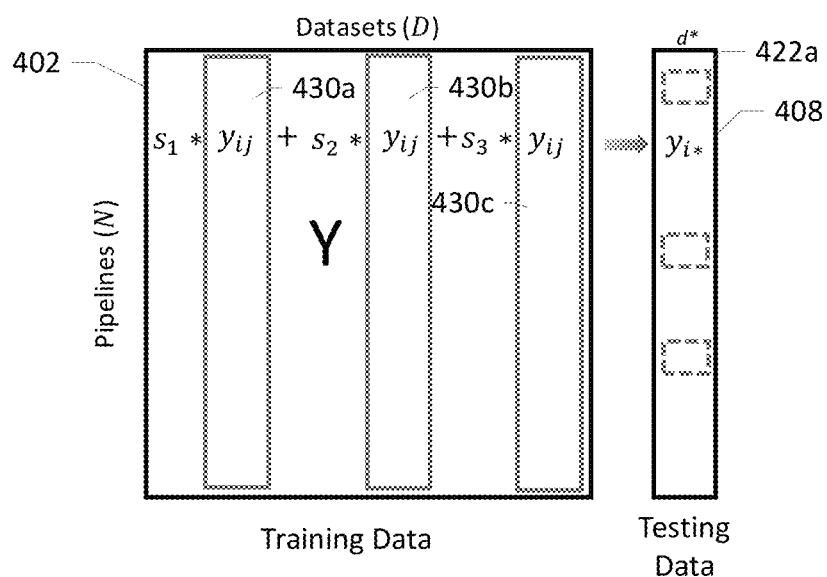
Figure 5:
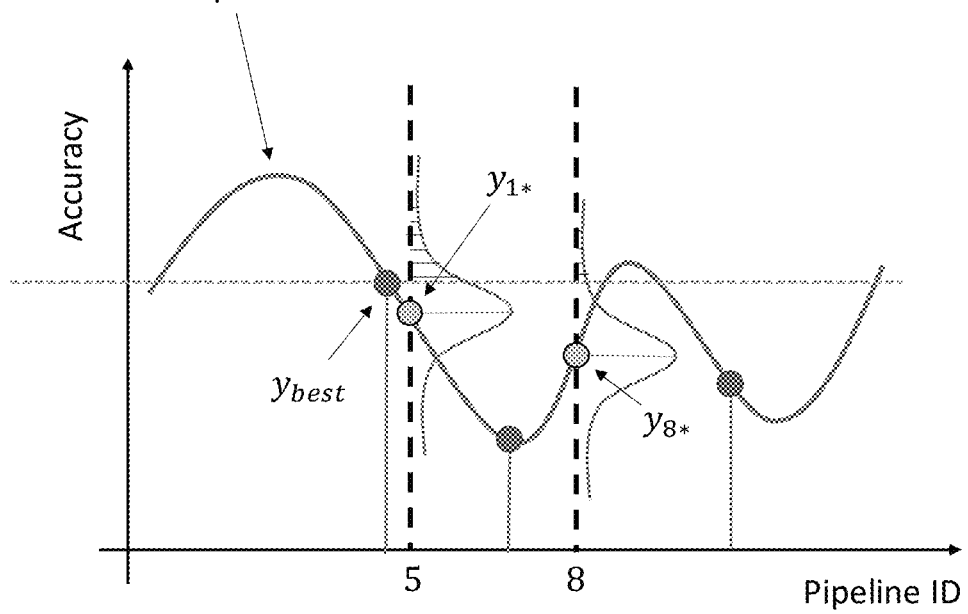
FIG. 5 illustrates an expected improvement graph, according to the present disclosure.

FIG. 4D illustrates the use of Bayesian optimization in the nearest neighbor pipeline recommendation. As illustrated in FIG. 4D, the performance data (e.g., accuracies) associated with the selected columns (e.g., column 430a, column 430b, column 430c, etc.) of the performance matrix 402 can be used to determine the mean and variance for each pipeline. Graph 500 of FIG. 5 illustrates an expected improvement in the Bayesian optimization.

Processing proceeds to operation S260, where the computing system (e.g., server computer 200 of FIG. 1 or the like) can select a defined number of machine-learning pipelines (e.g., top-k pipelines, next-k pipelines, etc.) as potential machine-learning pipelines for the testing data set based on the selected columns of the performance matrix. For example, in some embodiments, such as where an average rank for each pipeline is determined at operation S258, the computing system can select the top-k ranked pipelines from the unexecuted pipelines at operation S260. Alternatively, in some embodiments, the computing system can select the next number of pipelines to execute based on an expected, improvement criteria determined in a Bayesian optimization. The computing system can then execute the potential machine-learning pipelines.

Processing proceeds to operation S262, where the computing system (e.g., server computer 200 of FIG. 1 or the like) can store the results from executing each of the potential machine-learning pipelines. For example, the results of the pipeline executions can be stored associated with the testing data set (d*). Processing proceeds to operation S264, where the computing system (e.g., server computer 200 of FIG. 1 or the like) can determine a pipeline accuracy for each of the potential machine-learning pipelines when executed against the testing data set and the entries (e.g., performance information) for the latest execution of pipelines can be stored. For example, the best accuracy obtained so far for the pipelines along with an identifier for the corresponding pipeline can be stored. As an example, FIGS. 4C and 4D illustrate testing data pipeline execution information 422a and/or the like, which record the results of the pipeline executions on the testing data set.

In some embodiments, the pipeline selection, execution, and accuracy determination of operations S254 through S264 can be repeated for a defined number of iterations to determine a best accuracy pipeline over the total number of iterations.

Processing proceeds to operation S266. where the computing system (e.g., server computer 200 of FIG. 1 or the like) can determine a recommended machine-learning pipeline for the testing data set based on the pipeline accuracy for each potential machine-learning pipeline. For example, the computing system can track the best accuracy and corresponding pipeline from the latest execution of potential pipelines and determine the recommended machine-learning pipeline based on the best accuracy achieved. Processing proceeds to operation S268, where the computing system (e.g., server computer 200 of FIG. 1 or the like) can provide the recommended machine-learning pipeline for use with the testing data set.

FIG. 3 provides a flowchart 350 depicting a computer-implemented method, provided in some embodiments, for initialization of nearest neighbor pipeline recommendation prior to the operations of flowchart 250 of FIG. 2, according to aspects of the present invention. In some embodiments, a nearest neighbor pipeline recommendation system can be initialized, for example, using L1-norm. As illustrated in FIG. 3, in some embodiments, operations for initialization of nearest neighbor pipeline recommendation begin at operation S352, where a computing system (e.g., server computer 200 of FIG. 1 or the like) obtains data set metafeatures for each of the plurality of training data sets in the performance matrix (e.g., a metafeatures matrix). For example, as illustrated in FIG. 4A and FIG. 4B, a data set metafeatures matrix U 406 can be provided where each column $u_j$ of the matrix 406 contains metafeatures corresponding to the data set $d_j$ of the performance matrix 402.

Processing proceeds to operation S354, where the computing system (e.g., server computer 200 of FIG. 1 or the like) can obtain data set metafeatures for the testing data set. For example, as illustrated in FIG. 4A and FIG. 4B, metafeatures u* 410 can be provided where the metafeatures included in u* are associated with the testing data set d* 408. In some embodiments, the metafeatures associated with a data set can include at least one or more of a number of missing values in a data set; a number of categorical features; a number of real-valued features; and quantile distributions of the data set or individual features.

Processing proceeds to operation S356, where the computing system (e.g., server computer 200 of FIG. 1 or the like) can determine a plurality of training data sets that are similar to the testing data set based in part on the data set metafeatures for each of the plurality of training data sets and the data set metafeatures for the testing data set. For example, in some embodiments, the computing system can compute an L1-norm of the data set metafeatures for the testing data set (e.g., metafeatures u*) with the data set metafeatures for each of the plurality of training data sets in the performance matrix (e.g., metafeatures $u_j$ in the metafeatures matrix U 406).

Processing proceeds to operation S358, where the computing system (e.g., server computer 200 of FIG. 1 or the like) can select a defined number of most similar training data sets associated with the data set metafeatures matrix. Processing proceeds to operation S360, where the computing system (e.g., server computer 200 of FIG. 1 or the like) can select one or more columns from the performance matrix that correspond to the selected most similar training data sets. For example, the computing system can select the corresponding top-k most similar columns of the performance matrix based on data set similarity determined using the metafeatures (e.g., corresponding to the data sets selected in the metafeatures matrix based on similarity to the testing data metafeatures). As illustrated in FIG. 4B, the similarity assessment using the metafeatures $u_j$ of the metafeatures matrix U 406 and the testing data set metafeatures u* 410 (e.g., the L1-norm of u* with $u_j$) shows metafeatures 412a, etc. which provide for the selection of the corresponding columns 414a, etc. of the performance matrix 402.

Processing proceeds to operation S362, where the computing system (e.g., server computer 200 of FIG. 1 or the like) can determine an initialization stage average rank for each machine-learning pipeline based on the selected columns of the performance matrix. For example, in some embodiments, each selected column of the performance matrix (e.g., representing a training data set dj) can be converted to a rank whereby each of the pipelines is ranked based on the pipeline accuracy (e.g., included in the performance matrix). As an example, the best ranked pipeline in the column can be ranked 1 and the least accurate pipeline can be ranked n. After ranking the pipelines in each column of the performance matrix, an average rank per pipeline can be computed.

Processing proceeds to operation S364, where the computing system (e.g., server computer 200 of FIG. 1 or the like) can select a plurality of machine-learning pipelines as initialization stage machine-learning pipelines based on the initialization stage average rank for each machine-learning pipeline. For example, in some embodiments, the computing system can select the top-k ranked pipelines as the initialization stage machine-learning pipelines to be executed. The computing system can execute each of the initialization stage machine-learning pipelines on the testing data set.

Processing proceeds to operation S366, where the computing system (e.g., server computer 200 of FIG. 1 or the like) can store the initialization stage results from executing each of the initialization stage machine-learning pipelines as an initialization data set. As an example, in FIG. 4A, can execute one or more of the selected initialization pipelines in training datasets D 402 against the testing data set d* 408 and record the results 416a associated with testing data set d* 408. For example, the initialization stage results may be representative of the pipeline accuracies resulting from execution of the initialization stage machine-learning pipelines. Processing proceeds to operation S368, where the computing system (e.g., server computer 200 of FIG. 1 or the like) can provide the initialization data set as the testing data set. For example, in some embodiments, in response to completion of the initialization operations, the computing system can provide the initialization data set as the testing data set for use in computing the similarity at operation S254 of flowchart 250 in FIG. 2.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    obtaining a performance matrix representing accuracies obtained by executing a plurality of machine-learning pipelines on a plurality of training data sets, wherein a machine-learning pipeline comprises a series of operations performed on a data set;
    selecting a defined number of top machine-learning pipelines as potential machine-learning pipelines for a testing data set based, at least in part, on computing a similarity between the testing data set and each of the plurality of training data sets represented in the performance matrix;
    determining a pipeline accuracy for each of the potential machine-learning pipelines when executed against the testing data set;
    providing a recommended machine-learning pipeline for use with the testing data set based, at least in part, on the pipeline accuracy for each potential machine-learning pipeline; and
    performing initialization for pipeline recommendation prior to the computing of similarities between the testing data set and each of the plurality of training data sets represented in the performance matrix, the initialization comprising:
        obtaining data set metafeatures for each of the plurality of training data sets in the performance matrix;
        obtaining data set metafeatures for the testing data set;
        determining a plurality of similar training data sets that are similar to the testing data set based in part on the data set metafeatures for each of the plurality of training data sets and the data set metafeatures for the testing data set;
        selecting a defined number of most similar training data sets;
        selecting one or more columns from the performance matrix that correspond to the selected most similar training data sets;
        determining an initialization stage average rank for each machine-learning pipeline based on the selected columns of the performance matrix;
        selecting a plurality of top machine-learning pipelines as initialization stage machine-learning pipelines based on the initialization stage average rank for each machine-learning pipeline;
        storing initialization stage results from executing each of the initialization stage machine-learning pipelines as an initialization data set; and
        providing the initialization data set as the testing data set;
    storing results from executing each of the potential machine-learning pipelines as a new data set.

2. The computer-implemented method of claim 1 wherein selecting the defined number of top machine-learning pipelines as potential machine-learning pipelines for the testing data set further comprises:
    selecting a defined number of columns of the performance matrix based on the similarity between the testing data set and each of the plurality of training data sets; and
    selecting the defined number of top machine-learning pipelines as potential machine-learning pipelines for the testing data set based on the selected columns of the performance matrix.

3. The computer-implemented method of claim 2 further comprising:
    determining an average rank for each machine-learning pipeline based on the selected columns of the performance matrix and the accuracies represented in the performance matrix; and
    selecting the defined number of top machine-learning pipelines based on the average rank for each machine-learning pipeline.

4. The computer-implemented method of claim 2, wherein when computing the similarity between the testing data set and each of the plurality of training data sets, only entries that are present in both the training data set and the testing data set being compared for similarity are used.

5. The computer-implemented method of claim 1 further comprising:
    determining a similarity-weighted mean and variance of pipeline accuracy for each machine-learning pipeline; and
    selecting the defined number of top machine-learning pipelines based on an expected, improvement criteria associated with the mean and variance.

6. The computer-implemented method of claim 1, wherein the data set metafeatures for each of the plurality of training data sets and the metafeatures for the testing data set comprise:
   a number of missing values in a data set;
   a number of categorical features;
   a number of real-valued features; and
   quantile distributions of the data set or individual features.

7. The computer-implemented method of claim 1, wherein each (i, j) entry in the performance matrix represents an accuracy obtained by executing a pipeline i and a training data set j.

8. The computer-implemented method of claim 1 further comprising performing an iterative series of pipeline accuracy determinations, for a defined number of iterations, in response to the determining of the pipeline accuracy for each of the potential machine-learning pipelines when executed against the testing data set and prior to providing the recommended machine-learning pipeline, the performing of the iterative series of pipeline accuracy determinations comprising:
   computing a similarity between the stored results from executing each of the potential machine-learning pipelines and each of the plurality of training data sets represented in the performance matrix;
   selecting a defined number of columns of the performance matrix based on the similarity between the stored results and each of the plurality of training data sets;
   determining an average rank for each machine-learning pipeline based on the selected columns of the performance matrix;
   selecting a defined number of top-ranked machine-learning pipelines that are unexecuted as potential machine-learning pipelines;
   storing iteration result sets from executing each of the potential machine-learning pipelines;
   determining the pipeline accuracy for each of the potential machine-learning pipelines when executed against the stored iteration result sets; and
   determining a new recommended machine-learning pipeline based on the pipeline accuracy for each potential machine-learning pipeline.

9. A computer program product comprising a computer readable storage medium having stored thereon:
   program instructions programmed to obtain a performance matrix representing accuracies obtained by executing a plurality of machine-learning pipelines on a plurality of training data sets, wherein a machine-learning pipeline comprises a series of operations performed on a data set;
   program instructions programmed to select a defined number of top machine-learning pipelines as potential machine-learning pipelines for a testing data set based on computing a similarity between the testing data set and each of the plurality of training data sets represented in the performance matrix;
   program instructions programmed to store results from executing each of the potential machine-learning pipelines as a new data set;
   program instructions programmed to determine a pipeline accuracy for each of the potential machine-learning pipelines when executed against the testing data set;
   program instructions programmed to provide a recommended machine-learning pipeline for use with the testing data set based, at least in part, on the pipeline accuracy for each potential machine-learning pipeline; and
   program instructions programmed to perform initialization for pipeline recommendation prior to the computing of similarities between the testing data set and each of the plurality of training data sets represented in the performance matrix, the initialization comprising:
      obtaining data set metafeatures for each of the plurality of training data sets in the performance matrix;
      obtaining data set metafeatures for the testing data set;
      determining a plurality of similar training data sets that are similar to the testing data set based in part on the data set metafeatures for each of the plurality of training data sets and the data set metafeatures for the testing data set;
      selecting a defined number of most similar training data sets;
      selecting one or more columns from the performance matrix that correspond to the selected most similar training data sets;
      determining an initialization stage average rank for each machine-learning pipeline based on the selected columns of the performance matrix;
      selecting a plurality of top machine-learning pipelines as initialization stage machine-learning pipelines based on the initialization stage average rank for each machine-learning pipeline;
      storing initialization stage results from executing each of the initialization stage machine-learning pipelines as an initialization data set; and
      providing the initialization data set as the testing data set;
      storing results from executing each of the potential machine-learning pipelines as a new data set.

10. The computer program product of claim 9, wherein the computer readable storage medium has further stored thereon:
   program instructions programmed to select a defined number of columns of the performance matrix based on the similarity between the testing data set and each of the plurality of training data sets; and
   program instructions programmed to select the defined number of top machine-learning pipelines as potential machine-learning pipelines for the testing data set based on the selected columns of the performance matrix.

11. The computer program product of claim 10, wherein the computer readable storage medium has further stored thereon:
   program instructions programmed to determine an average rank for each machine-learning pipeline based on the selected columns of the performance matrix and the accuracies represented in the performance matrix; and
   program instructions programmed to select the defined number of top machine-learning pipelines based on the average rank for each machine-learning pipeline.

12. The computer program product of claim 10, wherein the computer readable storage medium has further stored thereon:
   program instructions programmed to determine a similarity-weighted mean and variance of pipeline accuracy for each machine-learning pipeline; and
   program instructions programmed to select the defined number of top machine-learning pipelines based on an expected, improvement criteria associated with the mean and variance.

13. The computer program product of claim 9, wherein the data set metafeatures for each of the plurality of training data sets and the metafeatures for the testing data set comprise:
  a number of missing values in a data set;
  a number of categorical features;
  a number of real-valued features; and
  quantile distributions of the data set or individual features.

14. The computer program product of claim 9, wherein the computer readable storage medium has further stored thereon program instructions programmed for:
  performing an iterative series of pipeline accuracy determinations, for a defined number of iterations, in response to the determining of the pipeline accuracy for each of the potential machine-learning pipelines when executed against the testing data set and prior to providing the recommended machine-learning pipeline, the performing of the iterative series of pipeline accuracy determinations comprising:
  computing a similarity between the stored results from executing each of the potential machine-learning pipelines and each of the plurality of training data sets represented in the performance matrix;
  selecting a defined number of columns of the performance matrix based on the similarity between the stored results and each of the plurality of training data sets;
  determining an average rank for each machine-learning pipeline based on the selected columns of the performance matrix;
  selecting a defined number of top-ranked machine-learning pipelines that are unexecuted as potential machine-learning pipelines;
  storing iteration result sets from executing each of the potential machine-learning pipelines;
  determining the pipeline accuracy for each of the potential machine-learning pipelines when executed against the stored iteration result sets; and
  determining a new recommended machine-learning pipeline based on the pipeline accuracy for each potential machine-learning pipeline.

15. A computer system comprising:
  a processor(s) set; and
  a computer readable storage medium;
  wherein:
    the processor set is structured, located, connected and/or programmed to run program instructions stored on the computer readable storage medium; and
    the stored program instructions include:
      program instructions programmed to obtain a performance matrix representing accuracies obtained by executing a plurality of machine-learning pipelines on a plurality of training data sets, wherein a machine-learning pipeline comprises a series of operations performed on a data set;
      program instructions programmed to select a defined number of top machine-learning pipelines as potential machine-learning pipelines for a testing data set based, at least in part, on computing a similarity between the testing data set and each of the plurality of training data sets represented in the performance matrix;
      program instructions programmed to store results from executing each of the potential machine-learning pipelines as a new data set;
      program instructions programmed to determine a pipeline accuracy for each of the potential machine-learning pipelines when executed against the testing data set; and
      program instructions programmed to provide a recommended machine-learning pipeline for use with the testing data set based, at least in part, on the pipeline accuracy for each potential machine-learning pipeline,
      program instructions programmed to perform initialization for pipeline recommendation prior to the computing of similarities between the testing data set and each of the plurality of training data sets represented in the performance matrix, the initialization comprising:
        obtaining data set metafeatures for each of the plurality of training data sets in the performance matrix;
        obtaining data set metafeatures for the testing data set;
        determining a plurality of similar training data sets that are similar to the testing data set based in part on the data set metafeatures for each of the plurality of training data sets and the data set metafeatures for the testing data set;
        selecting a defined number of most similar training data sets;
        selecting one or more columns from the performance matrix that correspond to the selected most similar training data sets;
        determining an initialization stage average rank for each machine-learning pipeline based on the selected columns of the performance matrix;
        selecting a plurality of top machine-learning pipelines as initialization stage machine-learning pipelines based on the initialization stage average rank for each machine-learning pipeline;
        storing initialization stage results from executing each of the initialization stage machine-learning pipelines as an initialization data set; and
        providing the initialization data set as the testing data set;
      storing results from executing each of the potential machine-learning pipelines as a new data set.

16. The computer system of claim 15, wherein the stored program instructions further include:
  program instructions programmed to select a defined number of columns of the performance matrix based on the similarity between the testing data set and each of the plurality of training data sets; and
  program instructions programmed to select the defined number of top machine-learning pipelines as potential machine-learning pipelines for the testing data set based on the selected columns of the performance matrix.

17. The computer system of claim 16, wherein the stored program instructions further include:
  program instructions programmed to determine an average rank for each machine-learning pipeline based on the selected columns of the performance matrix and the accuracies represented in the performance matrix; and
  program instructions programmed to select the defined number of top machine-learning pipelines based on the average rank for each machine-learning pipeline.

18. The computer system of claim 15, wherein the stored program instructions further include:

program instructions programmed to determine a similarity-weighted mean and variance of pipeline accuracy for each machine-learning pipeline; and program instructions programmed to select the defined number of top machine-learning pipelines based on an expected, improvement criteria associated with the mean and variance.

19. The computer system of claim 15, wherein the data set metafeatures for each of the plurality of training data sets and the metafeatures for the testing data set comprise:

a number of missing values in a data set;

a number of categorical features;

a number of real-valued features; and quantile distributions of the data set or individual features.

20. The computer system of claim 15, wherein the stored program instructions further include program instructions programmed to perform an iterative series of pipeline accuracy determinations, for a defined number of iterations, in response to the determining of the pipeline accuracy for each of the potential machine-learning pipelines when executed against the testing data set and prior to providing the recommended machine-learning pipeline, the performing of the iterative series of pipeline accuracy determinations comprising:

computing a similarity between the stored results from executing each of the potential machine-learning pipelines and each of the plurality of training data sets represented in the performance matrix;

selecting a defined number of columns of the performance matrix based on the similarity between the stored results and each of the plurality of training data sets;

determining an average rank for each machine-learning pipeline based on the selected columns of the performance matrix;

selecting a defined number of top-ranked machine-learning pipelines that are unexecuted as potential machine-learning pipelines;

storing iteration result sets from executing each of the potential machine-learning pipelines;

determining the pipeline accuracy for each of the potential machine-learning pipelines when executed against the stored iteration result sets; and determining a new recommended machine-learning pipeline based on the pipeline accuracy for each potential machine-learning pipeline.

\* \* \* \* \*